(12) United States Patent
Abe et al.

(10) Patent No.: US 7,401,816 B2
(45) Date of Patent: Jul. 22, 2008

(54) SNOWMOBILE WITH IMPROVED FUEL TANK STRUCTURE

(75) Inventors: Tomohisa Abe, Saitama (JP); Kozo Yamada, Saitama (JP)

(73) Assignee: Honda Motor Co., Ltd., Tokyo (JP)

( * ) Notice: Subject to any disclaimer, the term of this patent is extended or adjusted under 35 U.S.C. 154(b) by 388 days.

(21) Appl. No.: 11/064,419

(22) Filed: Feb. 23, 2005

(65) Prior Publication Data
US 2005/0241867 A1 Nov. 3, 2005

(30) Foreign Application Priority Data
Mar. 11, 2004 (JP) .............................. 2004-068940

(51) Int. Cl.
*B60P 3/22* (2006.01)
*B62M 29/00* (2006.01)
*F02M 37/10* (2006.01)
*B65D 85/68* (2006.01)

(52) U.S. Cl. .................. 280/835; 180/182; 123/509; 206/0.6

(58) Field of Classification Search ............ 137/565.01, 137/565.17, 590; 180/182; 123/509; 280/835; 206/0.6
See application file for complete search history.

(56) References Cited

U.S. PATENT DOCUMENTS

| | | | | |
|---|---|---|---|---|
| RE28,955 | E * | 9/1976 | Stanberry et al. | 114/55.55 |
| 5,251,718 | A * | 10/1993 | Inagawa et al. | 180/190 |
| 5,660,245 | A * | 8/1997 | Marier et al. | 180/190 |
| 5,829,545 | A * | 11/1998 | Yamamoto et al. | 180/190 |
| 6,598,593 | B1 | 7/2003 | Kanamaru et al. | |
| 6,923,287 | B2 * | 8/2005 | Morii | 180/292 |
| 6,941,924 | B2 * | 9/2005 | Morii et al. | 123/198 R |
| 2001/0040063 | A1 * | 11/2001 | Wubbolts et al. | 180/183 |
| 2001/0040064 | A1 * | 11/2001 | Girouard et al. | 180/183 |
| 2002/0020573 | A1 | 2/2002 | Fournier et al. | |
| 2002/0112907 | A1 * | 8/2002 | Maeda et al. | 180/69.4 |

(Continued)

FOREIGN PATENT DOCUMENTS

JP 55-039830 3/1980

(Continued)

*Primary Examiner*—Lesley D. Morris
*Assistant Examiner*—Daniel Yeagley
(74) *Attorney, Agent, or Firm*—Carrier, Blackman & Associates, P.C.; William D. Blackman; Joseph P. Carrier

(57) ABSTRACT

A snowmobile includes a seat for the rider behind an engine and an air cleaner, and an elongate fuel tank below the seat. The height of the ceiling of the fuel tank at a location corresponding to the rider seating position is lower than the height of the ceiling of the fuel tank at other portions thereof. A raised ceiling portion is provided in the fuel tank by raising upwards the front side of the fuel tank. A fuel pump is provided in the raised ceiling portion of the fuel tank. The fuel pump is attached to the ceiling of the fuel tank, and a fuel supply pipe for supplying fuel from the fuel tank resides between the fuel pump and the front side of the fuel tank. The snowmobile having such fuel tank stabilizes vehicle body during operation, enhances the seating comfort, and easily incorporates a fuel pump therein.

16 Claims, 7 Drawing Sheets

U.S. PATENT DOCUMENTS

| | | | |
|---|---|---|---|
| 2002/0189877 A1* | 12/2002 | Yagisawa et al. | 180/219 |
| 2003/0074965 A1* | 4/2003 | Okamoto | 73/313 |
| 2004/0104063 A1* | 6/2004 | Cadotte et al. | 180/190 |
| 2005/0199431 A1* | 9/2005 | Hoi | 180/190 |

FOREIGN PATENT DOCUMENTS

| | | | |
|---|---|---|---|
| JP | 09053539 A | * | 2/1997 |
| JP | 10212940 A | * | 8/1998 |

* cited by examiner

SNOWMOBILE WITH IMPROVED FUEL TANK STRUCTURE

CROSS-REFERENCE TO RELATED APPLICATIONS

The present invention claims priority under 35 USC 119 based on Japanese patent application No. 2004-068940, filed on Mar. 11, 2004, published 22 Sep. 2005 as publication number 2005-254968. The subject matter of this priority document is incorporated by reference herein.

BACKGROUND OF THE INVENTION

1. Field of the Invention

The present invention relates to a snowmobile comprising a fuel pump disposed inside a fuel tank, the fuel tank provided below a rider's seat.

2. Description of the Background Art

Conventionally, in a known snowmobile the structure and layout of the fuel tank have been redesigned so as to place the seating position of the rider closer to the engine. This configuration is disclosed, for example, in US Patent Application Publication No. 2002/0020573A1 to Fournier et al. By positioning the rider close to the engine, the snowmobile body is more stable during operation, and ride comfort is improved.

Also with respect to known snowmobiles, in recent years, engines provided with an injector for injecting a fuel have come to be adopted. Fuel injectors require a supply of high pressure fuel. To provide the required pressure to the fuel supply, it is necessary to incorporate a fuel pump in the fuel tank. Since the fuel pump is comparatively large in size, the fuel tank disclosed by Fournier et al. is insufficient in height, making it difficult to lay out the fuel pump therein.

SUMMARY OF THE INVENTION

Accordingly, it is an object of the present invention to provide a snowmobile comprising a fuel tank with which it is possible to stabilize the posture of the vehicle body during operation thereof, to enhance the seating comfort of the rider, and to easily incorporate a fuel pump therein.

The invention as set forth below resides in a snowmobile. The snowmobile comprises a seat for a driver on the rear side of an engine. The engine is provided at a front portion of a vehicle body. A fuel tank is provided at a lower portion of the seat, and is elongated in the front-rear direction of the vehicle. According to one aspect of the invention, the height of a top surface of the fuel tank at a rear portion of the seat is lower than the height of the top surface of the fuel tank at other portions. Also, a raised top surface portion is provided in the fuel tank by raising upward the fuel tank top surface at the front side thereof relative to the top surface at a rear portion of the fuel tank, and a fuel pump is provided in the raised top surface portion for feeding a fuel in the fuel tank to the engine under pressure.

According to a second aspect of the invention, the fuel pump is mounted to the top surface of the fuel tank.

According to a third aspect of the invention, a fuel supply pipe for supplying fuel to the fuel tank is provided adjacent to the front side of the fuel tank, between the front side of the fuel tank and the fuel pump.

According to a fourth aspect of the invention, an air cleaner is disposed between the fuel tank and the engine.

According to a fifth aspect of the invention, a cylinder of the engine is disposed so as to be inclined toward the rear of the snowmobile.

According to the first aspect of the invention, since the raised top surface portion is provided adjacent to the front side of the fuel tank, and the fuel pump is disposed in the raised top surface portion, even a fuel pump having a large dimension in the vertical direction can be laid out under the seat.

In addition, since the height of the top surface of the fuel tank at a rear portion of the seat is lower than the height of the top surface of the fuel tank at other portions, the thickness of the seat at the normal rider seating position is secured to be sufficient. Thus, the rider's seating comfort is enhanced.

According to the second aspect of the invention, since the fuel pump is mounted to the top surface of the fuel tank, the fuel pipe mounting and piping work can be easily carried out from the upper side of the fuel tank. In addition, maintenance, such as inspection and replacement of a fuel hose, is easily accomplished.

According to the third aspect of the invention, the fuel supply pipe for supplying fuel to the gas tank is provided on the front side of the fuel pump, which has the benefit that the length of the seat in the front to rear direction of the vehicle can be secured to be large.

According to the fourth aspect of the invention, since the air cleaner is disposed between the tank and the engine, inspection of the air cleaner and replacement of parts such as air filters can be easily carried out.

According to the fifth aspect of the invention, the cylinder of the engine is disposed so as to be inclined toward the rear of the vehicle, and this configuration lowers the center of gravity of the engine, and brings the center of gravity of the snowmobile closer to the center of the vehicle body.

Since the center of gravity is brought closer to the center of the vehicle body, vehicle body stability is improved, particularly during high-speed operation and operation on a largely rugged snow surfaces. As a result, more pleasant operating experience is achieved.

Modes for carrying out the present invention are explained below by reference to an embodiment of the present invention shown in the attached drawings. The above-mentioned object, other objects, characteristics and advantages of the present invention will become apparent from the detailed description of the embodiment of the invention presented below in conjunction with the attached drawings.

DETAILED DESCRIPTION OF THE INVENTION

Figure 1:
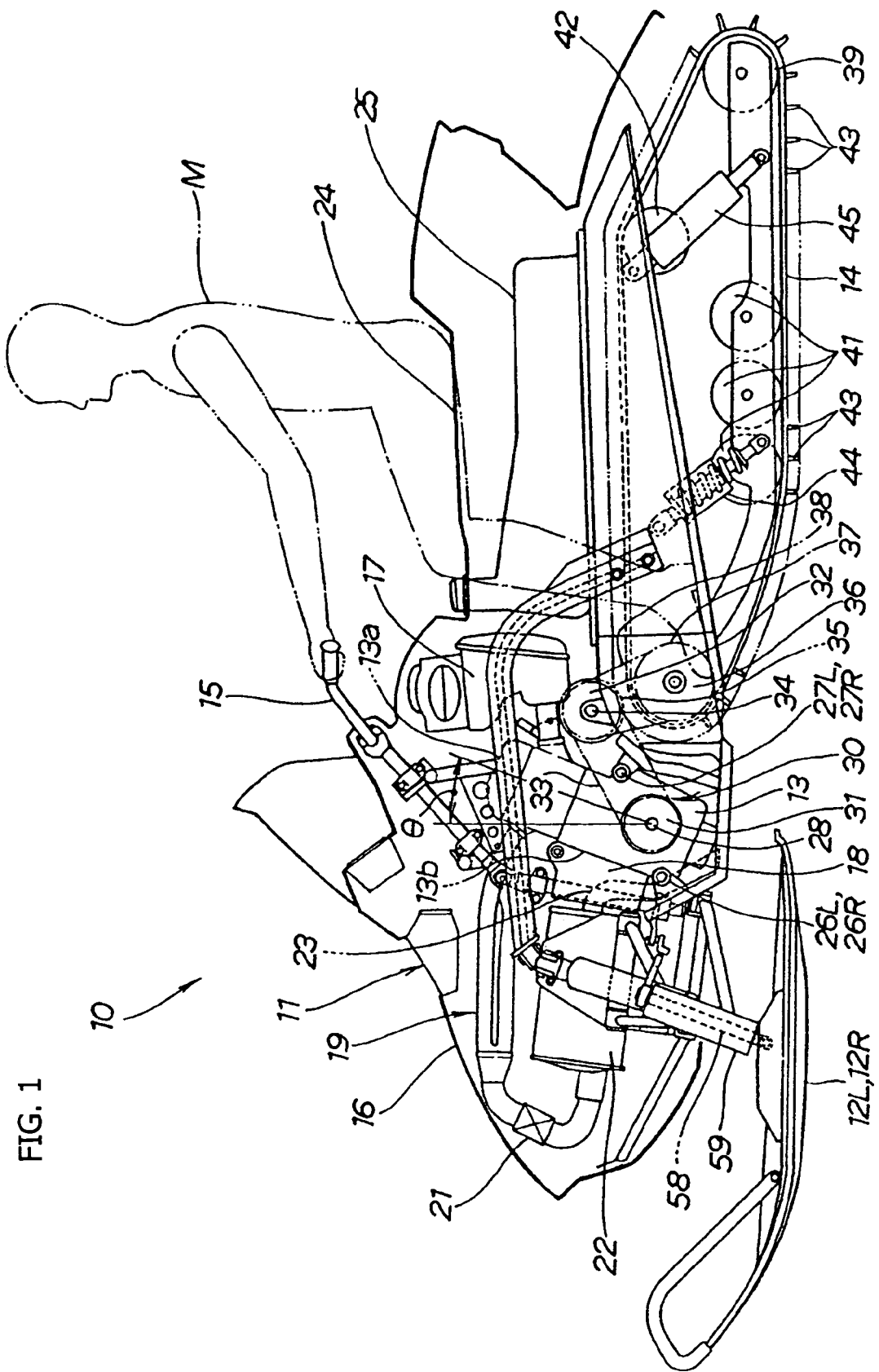
FIG. 1 is an overall side view of a snowmobile according to the present invention showing the shape and location of the fuel tank with respect to the engine and seat.

The best mode for carrying out the present invention will be described below, based on the accompanying drawings. In the drawings and the accompanying description, L is a subscript indicating the left as viewed from the driver, and R is a subscript indicating the right as viewed from the driver.

FIG. 1 is an overall side view of a snowmobile according to the present invention. The snowmobile 10 is a snow vehicle which comprises a left-right pair of skis 12L, 12R (12R is behind 12L, here and hereinafter), an engine 13 and a track belt 14 in this order as seen from the front side toward the rear side of a vehicle body 11. The snowmobile travels by driving the track belt 14 by the power of the engine 13, and the skis 12L, 12R are steered by operating a steering handle 15.

A seat 24 for the rider is provided on the rear side of the engine 13. The engine 13 is provided at a front portion of the vehicle body. A fuel tank 25 is provided below the seat 24, and is formed to be elongate the front-rear direction of the snowmobile 10.

In FIG. 1, a rider M is seated on seat 24. Also shown in FIG. 1, the engine 13 includes head portion of the engine 13a and a cylinder of the engine 13b. Also shown are a vehicle body cover 16, an air cleaner 17, an oil tank 18, an exhaust pipe 19, a catalytic converter 21, a muffler 22, and a tail pipe 23. The configuration of a steering system will be described below in detail with respect to another drawing.

First, an intake and exhaust system will be described. Air taken in through the air cleaner 17 is fed into a combustion chamber of the engine 13. Since the air cleaner 17 is disposed between the fuel tank 25 and the engine 13, inspection of the air cleaner 17 and replacement of an element can be easily carried out. A throttle valve 46 is provided on the downstream side of the air cleaner 17, and 47 denotes an injector provided on the downstream side relative to the throttle valve 46.

An exhaust gas, generated upon combustion, is discharged into the atmosphere through the exhaust pipe 19, the catalytic converter 21, the muffler 22, and the tail pipe 23. The tail pipe 12 extends from the muffler 22, then bends to extend transverse to the front-rear direction of the vehicle, and then bends again to extend downward, whereby the exhaust gas is blown to the snow surface.

Next, a drive system will be described. The engine 13 is mounted on a vehicle body frame through engine hangers 26L, 26R, 27L, 27R (details of the layout of them will be described later).

A drive pulley 31 is fitted over a crankshaft 28 of the engine 13. A continuously variable transmission (CVT) belt 33 is wrapped around both the drive pulley 31 and a driven pulley 32 disposed under the air cleaner 17. This configuration constitutes a belt-type non-stage transmission 30. A cross shaft 34 supports the driven pulley 32 and extends in the transverse direction. A sprocket 35 is attached to the tip end of the cross shaft 34, and a chain 38 is wrapped around both the sprocket 35 and a sprocket 37 annexed to a drive wheel 36.

The power of the engine 13 is transmitted sequentially through the drive pulley 31, the CVT belt 33, the driven pulley 32, the cross shaft 34, the sprocket 35, the chain 38, and the sprocket 37, whereby the drive wheel 36 can be rotated to drive the snowmobile 10 in the forward or reverse directions.

The endless track belt 14 wraps around the drive wheel 36, which is disposed at a front portion of the track belt 14. The track belt 14 also wraps around the driven wheel 39, disposed at a rear portion of the track belt 14, a plurality of rotary wheels 41 disposed at an intermediate lower portion of the track belt 14, and an idler 42 disposed at an upper portion of the track belt 14. Projections 43 are provided on the outside surface of the track belt 14, and are driven into the snow surface, to provide traction for traveling. Vertical movements of the track belt 14, generated at the time of riding over the ruggedness on the snow surface and the like, are absorbed by rear shock absorbers 44, 45.

Figure 2:
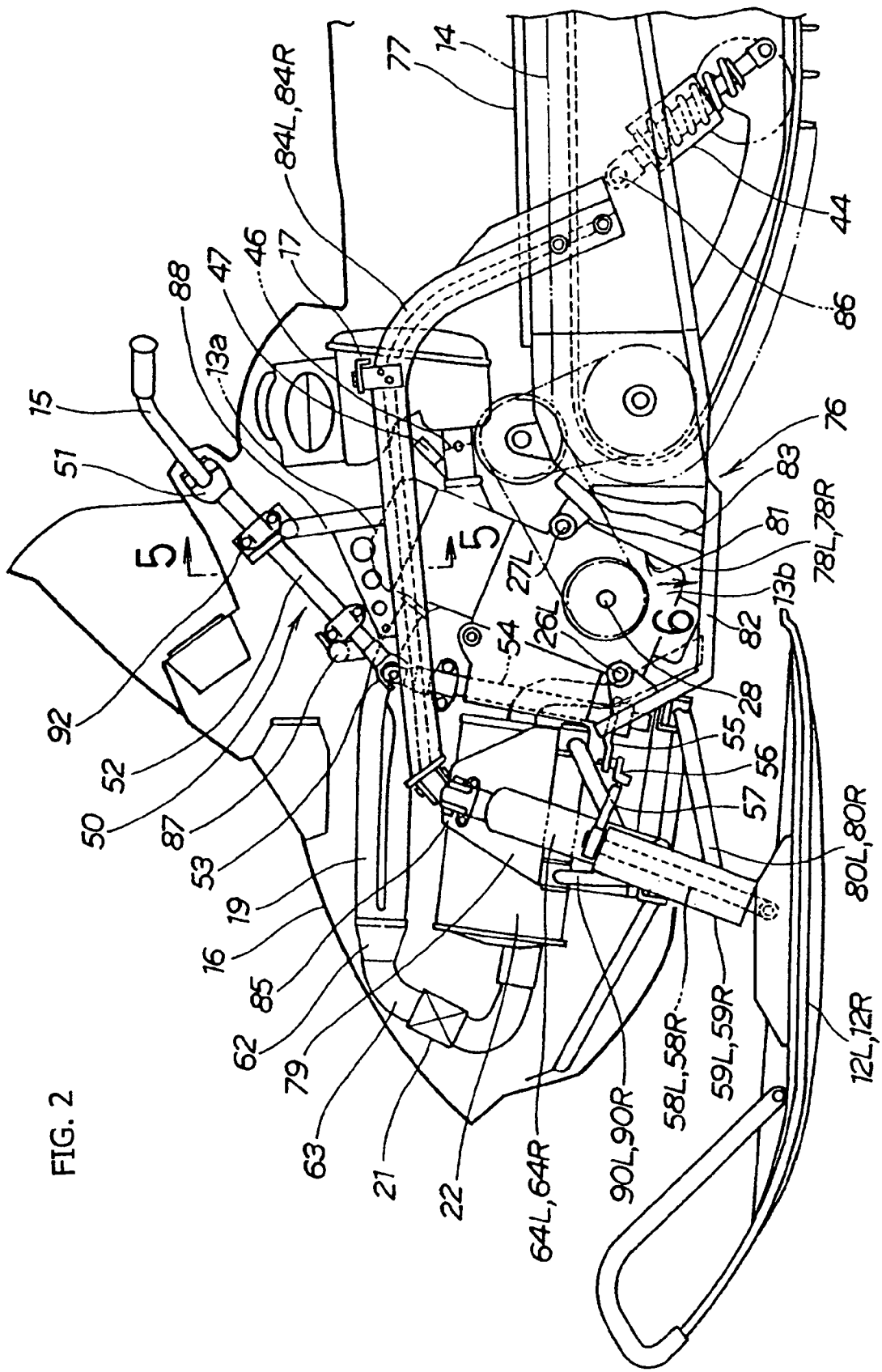
FIG. 2 is a partial side view of a front portion of the snowmobile according to the present invention showing the frame structures surrounding the engine.

FIG. 2 is a side view of a front portion of the snowmobile according to the present invention, in which the steering handle 15 and the skis 12L, 12R are connected by use of a steering shaft 50 (described below) and linking members. The steering shaft 50 is composed of a steering shaft upper portion 52 which is inclined forwardly downwards. A steering handle holder 51 is provided at the top end of the steering shaft upper portion 52. A universal joint 53 is attached to the lower end of the steering shaft upper portion 52, and a steering shaft lower portion 54 extends substantially vertically downwards from the universal joint 53.

A lever 55 is provided at the lower end of the steering shaft lower portion 54. A drive member 56 extends in the vehicle width direction and is connected to the lever 55. The levers 57 are attached respectively to the left and right ends of the drive member 56. Vertically directed spindles 58L, 58R are rotated about roughly vertical axes by the levers 57, whereby the skis 12L, 12R can be steered. The spindles 58L, 58R are rotatably contained in front leg portions 59L, 59R. The front leg portions 59L, 59R are vertically movably supported by lower arms 80L, 80R, upper arms 90L, 90R and front suspensions 64L, 64R, which are vertically movably mounted to the vehicle body frame.

In addition, a characteristic feature of the invention lies in that the muffler 22 is disposed on the front side (the left side as seen in the figure) of the engine 13, and the steering shaft lower portion 54 of the steering shaft 50 passes between the muffler 22 and the engine 13. The engine 13 is disposed on the rear side of the steering shaft lower portion 54. Namely, the steering shaft lower portion 54 is disposed on the front side of the engine 13, so that the engine 13 can be easily moved rearwards.

There are two possible configurations relating the steering shaft 50 and the muffler 22. In one configuration, the steering shaft lower portion 54 passes on the front side of the muffler 22. In the other configuration, the steering shaft lower portion 54 passes between the muffler 22 and the engine 13.

If, as in the first configuration, the steering shaft lower portion 54 passes on the front side of the muffler 22, the overall length of the steering shaft 50 becomes large. From this point of view, the second configuration is preferred in the present invention. Specifically, the steering shaft lower portion 54 passes between the muffler 22 and the engine 13, so that a shortened steering shaft 50 is easily achieved.

In addition, a characteristic feature of the invention resides in that the universal joint 53 is interposed at an intermediate portion of the steering shaft 50, and the steering shaft lower portion 54 is set close to the engine 13. When the steering shaft lower portion 54 is set close to the engine 13, the muffler 22 can also be set close to the engine 13. As a result, it is possible to achieve concentration of mass in the vehicle body front-rear direction.

The vehicle body frame 76 is a frame in which intermediate frames 78L, 78R formed in U shape in side view are connected to front portions of a rear frame 77. The rear frame 77 is roughly U shaped in section, opened to the lower side so as to straddle the top surface and the left and right side surfaces of the track belt 14. A front frame 79 is connected to front portions of the intermediate frames 78L, 78R. The vehicle body frame is characterized in that a reinforcement as described below is applied to the intermediate frames 78L, 78R.

The intermediate frames 78L, 78R are made to be U-shaped in side view, and each is provided with a cutout portion 81 for permitting the crankshaft 28 or the like to pass therethrough. Since the intermediate frames 78L, 78R are U-shaped frames, it is desirable to apply appropriate reinforcement to the frames. In view of this, an L-shaped reinforcement member 82 and an I-shaped reinforcement member 83 are annexed to each of the intermediate frames 78L, 78R along the cutout portion 81, to thereby reinforce the cutout portion 81.

Further, an upper portion of the front frame 79 and a front upper portion of the rear frame 77 are connected by side frames 84L, 84R so as to cross the cutout portion 81. Specifically, the front suspensions 64L, 64R are mounted to the front frame 79, and the tip ends of the side frames 84L, 84R are connected to the vicinity of a suspension receiving portion 85, provided for mounting the front suspensions 64L, 64R to the vehicle body frame. The rear shock absorber 44 is mounted to the rear frame 77, and the rear ends of the side frames 84L, 84R are connected rear frame 77 in the vicinity of a shock absorber receiving portion 86, provided for mounting the shock absorber 44 to the rear frame 77. By this configuration, the front frame 79 and the rear frame 77 are firmly connected to each other.

Returning to FIG. 1, the engine 13 is disposed so as to be inclined toward the rear of the vehicle. Specifically, the engine head portion 13a and the cylinder 13b are inclined rearward relative to the vertical axis by an angle θ. Thus, the center of gravity of the engine is lowered, and the center of gravity of the snowmobile is set to be close to the center of the vehicle body. Since the center of gravity is set to be close to the center of the vehicle body, it is possible to keep the vehicle body stable, particularly during high-speed operation and operation on a largely rugged snow surface. As a result, a more pleasant operating experience is achieved.

Figure 3:
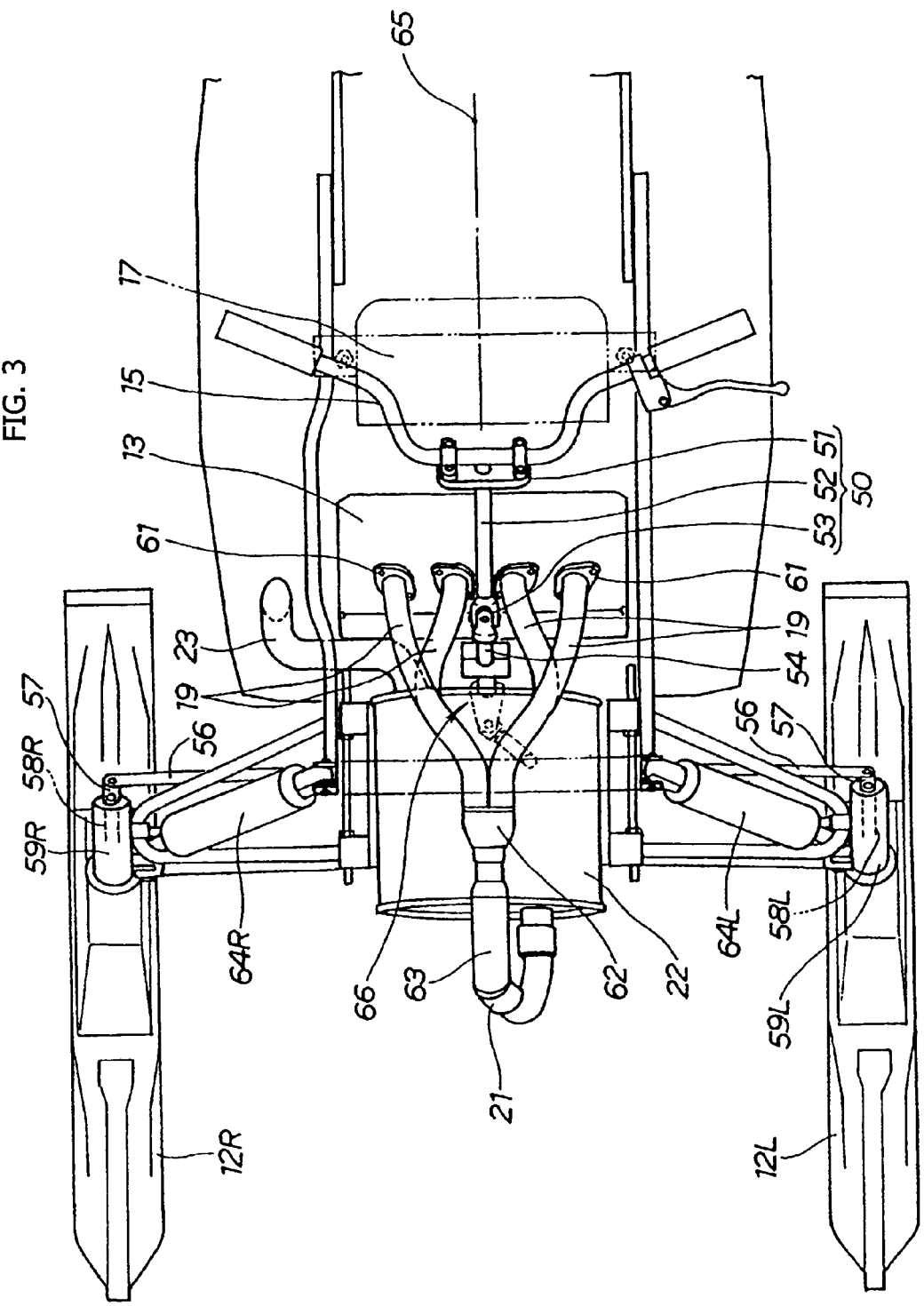
FIG. 3 is a plan view of the front portion of the snowmobile according to the present invention with the vehicle body cover omitted, showing alignment of the muffler and other exhaust system components with the vehicle longitudinal center line.

FIG. 3 is a plan view of a front portion of the snowmobile according to the present invention, illustrated with the vehicle body cover omitted. The engine 13, shown in this embodiment as a series 4-cylinder engine, is disposed so that the crankshaft extends in the vehicle width direction and that the plural exhaust ports 61 are directed toward the front side.

The plural exhaust pipes 19 extend respectively from the exhaust ports 61, and are united into a single pipe at an exhaust pipe manifold portion 62. A single manifolded exhaust pipe 63 extends forward from an outlet of the exhaust pipe manifold portion 62, is then bent back in a U shape, and is connected to a front portion of the muffler 22. The left and right front suspensions 64L, 64R are disposed respectively on the left side and the right side of the muffler 22.

As is clear from the figure, the muffler 22 is disposed so that the longitudinal axis of the muffler 22 is parallel to the longitudinal axis 65 of the vehicle body (an axis aligned with the vehicle centerline extending from front to rear of the vehicle). Thus, the length of the muffler 22 does affect the overall vehicle body width. The muffler 22 is disposed between the left and right front suspensions 64L, 64R, which allows adoption of a slim vehicle body and a reduction in the vehicle body size.

In addition, since the muffler 22 is disposed on the front side of the engine 13, the muffler 22 can be laid out on the longitudinal axis 65 or in the vicinity of the longitudinal axis 65. As a result, the vehicle is easily balanced in the left-right direction, and steering performance is enhanced.

Furthermore, the steering shaft 50 passes between adjacent exhaust pipes 19, 19. As a result, a dead space 66, which is customarily generated between the adjacent exhaust pipes 19, 19, is now used as an effective space.

Returning to FIG. 2, the exhaust pipes 19 and the exhaust pipe manifold portion 62 pass on the upper side of the muffler 22. Namely, the muffler 22 is disposed below the exhaust pipes 19. Mufflers 22 used in recent years are comparatively large in size and are heavy. Since a large, heavy muffler 22 is laid out at a low position, the center of gravity of the vehicle body is further lowered.

The vehicle body frame 76 is a frame in which the intermediate frames 78L, 78R, U-shaped in side view, are connected to front portions of the rear frame 77. As stated above, rear frame 77 has a roughly U shaped section opened to the lower side so as to straddle the upper surface and the left and right side surfaces of the track belt 14. The front frame 79 is connected to front portions of the intermediate frames 78L, 78R, such that the following reinforcement is applied to the intermediate frames 78L, 78R.

The intermediate frame 78L, 78R are frames U-shaped in side view and each are provided with the cutout portion 81 for permitting the crankshaft 28 or the like to pass therethrough. Since the intermediate frames 78L, 78R are U-shaped frames, it is desirable to reinforce them. In view of this, the L-shaped reinforcement member 82 and the I-shaped reinforcement member 83 are secured to the intermediate frames 78L, 78R along the cutout portion 81, to thereby reinforce the cutout portion 81.

Further, an upper portion of the front frame 79 and a front upper portion of the rear frame 77 are connected by side frames 84L, 84R, which extend so as to cross the cutout portion 81. Specifically, the front suspensions 64L, 64R are mounted to the front frame 79, and the tip ends of the side frames 84L, 84R are connected in the vicinity of the suspension receiving portion 85, provided for mounting the front suspensions 64L, 64R to the front frame 79. The rear shock absorber 44 is mounted to the rear frame 77, and the rear ends of the side frames 84L, 84R are connected to the rear frame 77 in the vicinity of the shock absorber receiving portion 86.

The portions between the upper ends of the front suspensions 64L, 64R, which support the skis, and a front portion of the rear shock absorber 44, which supports the track belt 14, are reinforced with the side frames 84L, 84R curved downwards. The side frames 84L, 84R can be detachably attached to the vehicle body frame 76. Firm connection between the front frame 79 and the rear frame 77 can be attained by the side frames 84L, 84R. The side frames 84L, 84R can be easily mounted to the vehicle body frame, so that it is possible to contrive a reduction in the number of steps for assembling the side frames 84L, 84R.

In addition, the air cleaner 17 is supported on the side frames 84L, 84R. Specifically, the air cleaner 17 is mounted from the outside for the purposes of enhancing the rigidity of the vehicle body frame 76, and so that the air cleaner 17 can be easily mounted.

Figure 4:
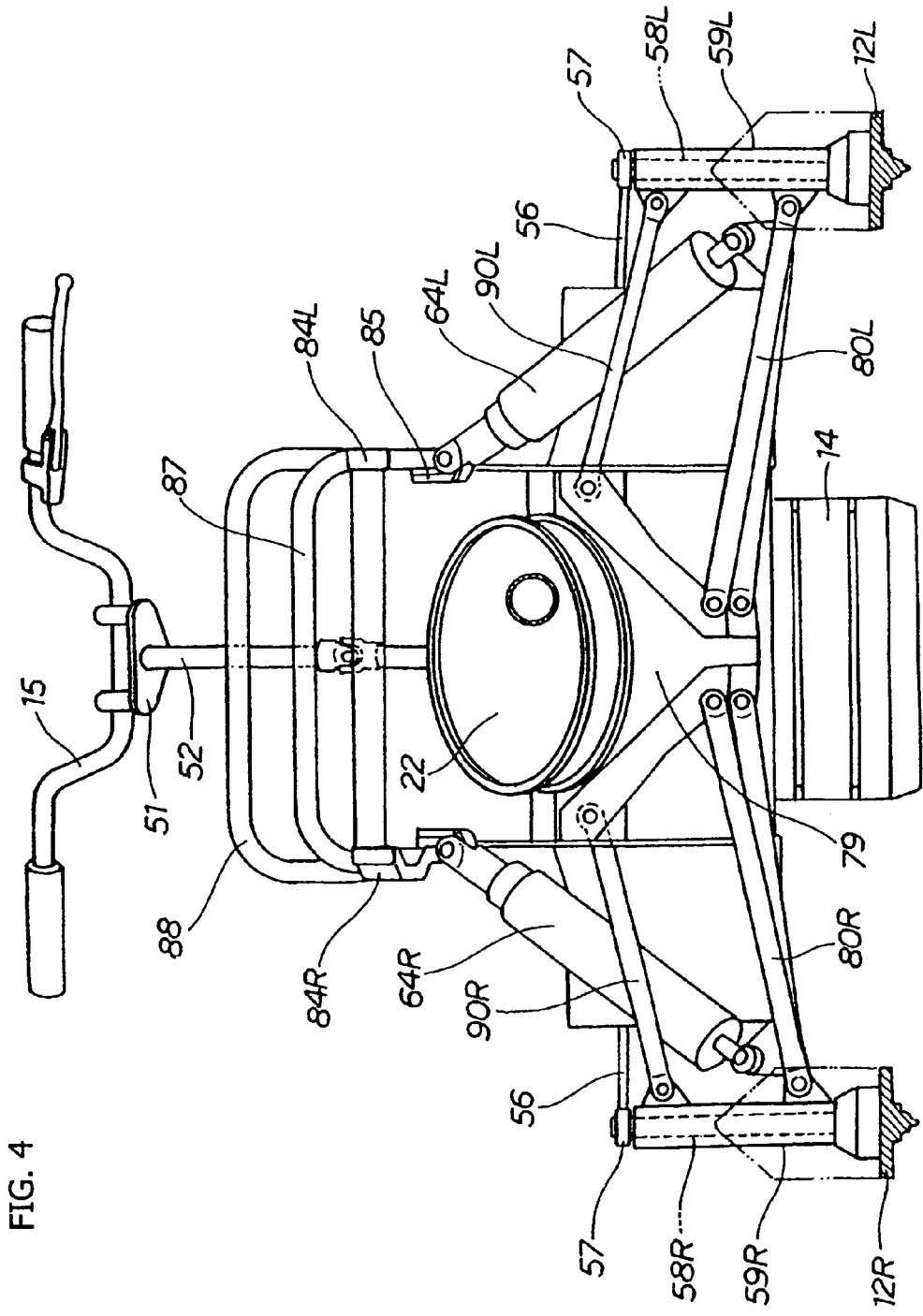
FIG. 4 is a front view of the snowmobile according to the present invention with the vehicle body cover omitted, showing the connection of the enhanced frame structure to the snowmobile suspension.

FIG. 4 is a front view of the snowmobile according to the present invention in which the vehicle body cover is omitted. A suspension mechanism for the skis 12L, 12R is provided as follows: As seen in this figure, the lower arms 80L, 80R extend to the left and right sides from the front frame 79, upper arms 90L, 90R extend to the left and right sides from the front frame 79, and the front leg portions 59L, 59R are connected to the tip ends of the arms 80L, 80R, 90L, 90R. In addition, the lower ends of the front suspensions 64L, 64R are connected to the tip ends of the lower arms 80L, 80R.

The left and right side frames 84L, 84R are present behind these portions as viewed in the figure to support the left and right front suspensions 64L, 64R. The front and rear two cross pipes 87, 88 are bridgingly disposed between the side frames 84L, 84R to form a structure that enhances the rigidity in the vehicle body transverse direction.

Figure 5:
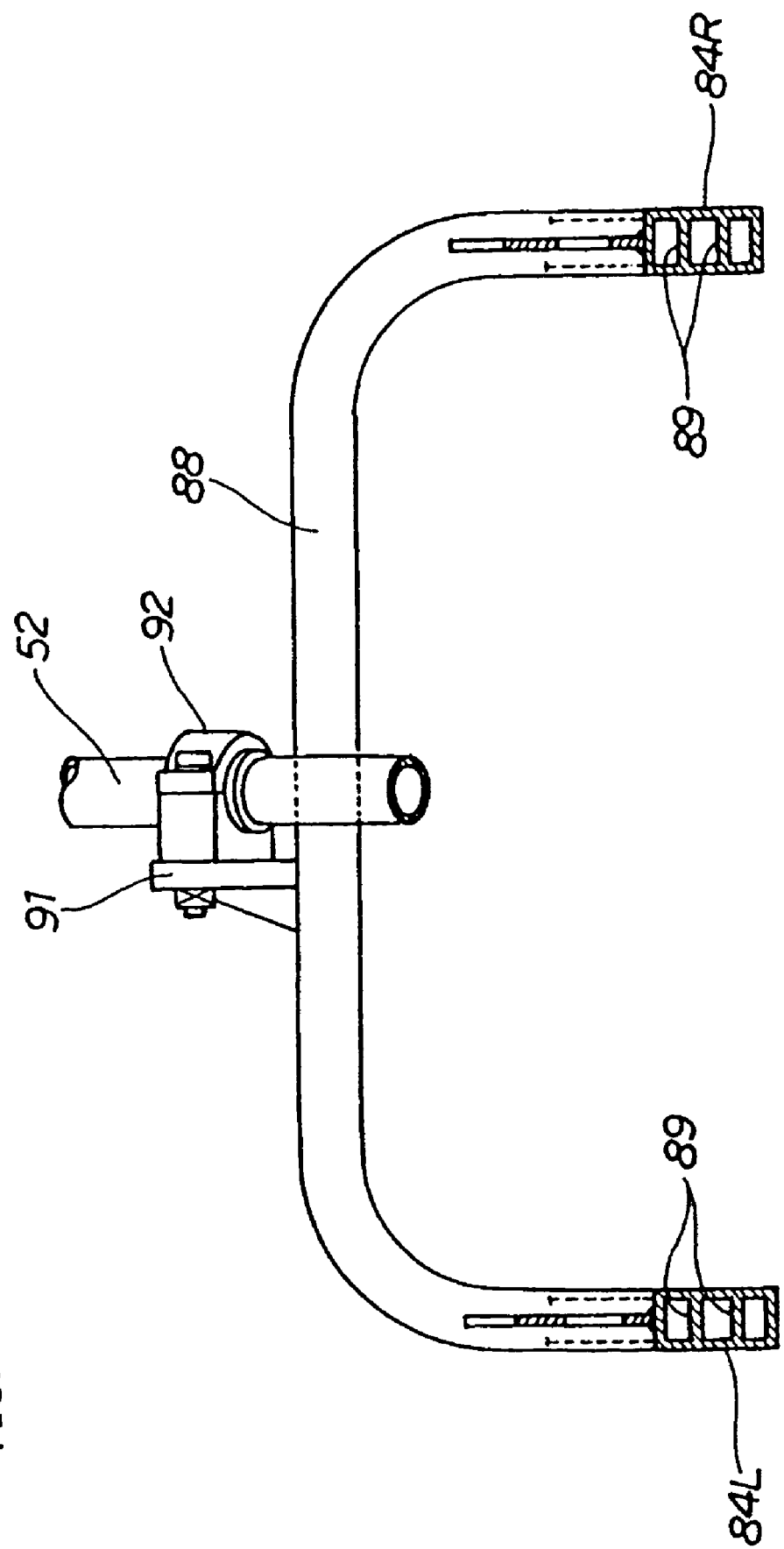
FIG. 5 is a sectional view along line 5-5 of FIG. 2 showing the crossbar which joins the opposed side frames, and showing the steering bar mounted to the cross bar.

FIG. 5 is a sectional view along line 5-5 of FIG. 2, in which the left and right side frames 84L, 84R, coupled by the cross pipe 88, are composed of extruded members being substantially rectangle-shaped in section. Also, two ribs 89, 89 are bridgingly provided in the inside of the extruded member, in addition to the substantially rectangle-shaped section, whereby it is possible to drastically enhance the flexural rigidity and deflectional rigidity. Since extrusion permits free selection of the sectional shape, a substantially rectangle-shaped section and a substantially rectangle-plus-internal rib shaped section can be selectively obtained by decreasing or increasing the number of the ribs 89.

In addition, the cross pipe 88 is provided with a bracket 91, a bearing block 92 is attached to the bracket 91, and the steering shaft upper portion 52 is rotatably supported on the bearing block 92. With the steering shaft upper portion 52 movably supported by ingeniously utilizing the cross pipe 88, provided to prevent transverse motion of the left and right side frames 84L, 84R, the cross pipe 88 has multiple functions.

Figure 6:
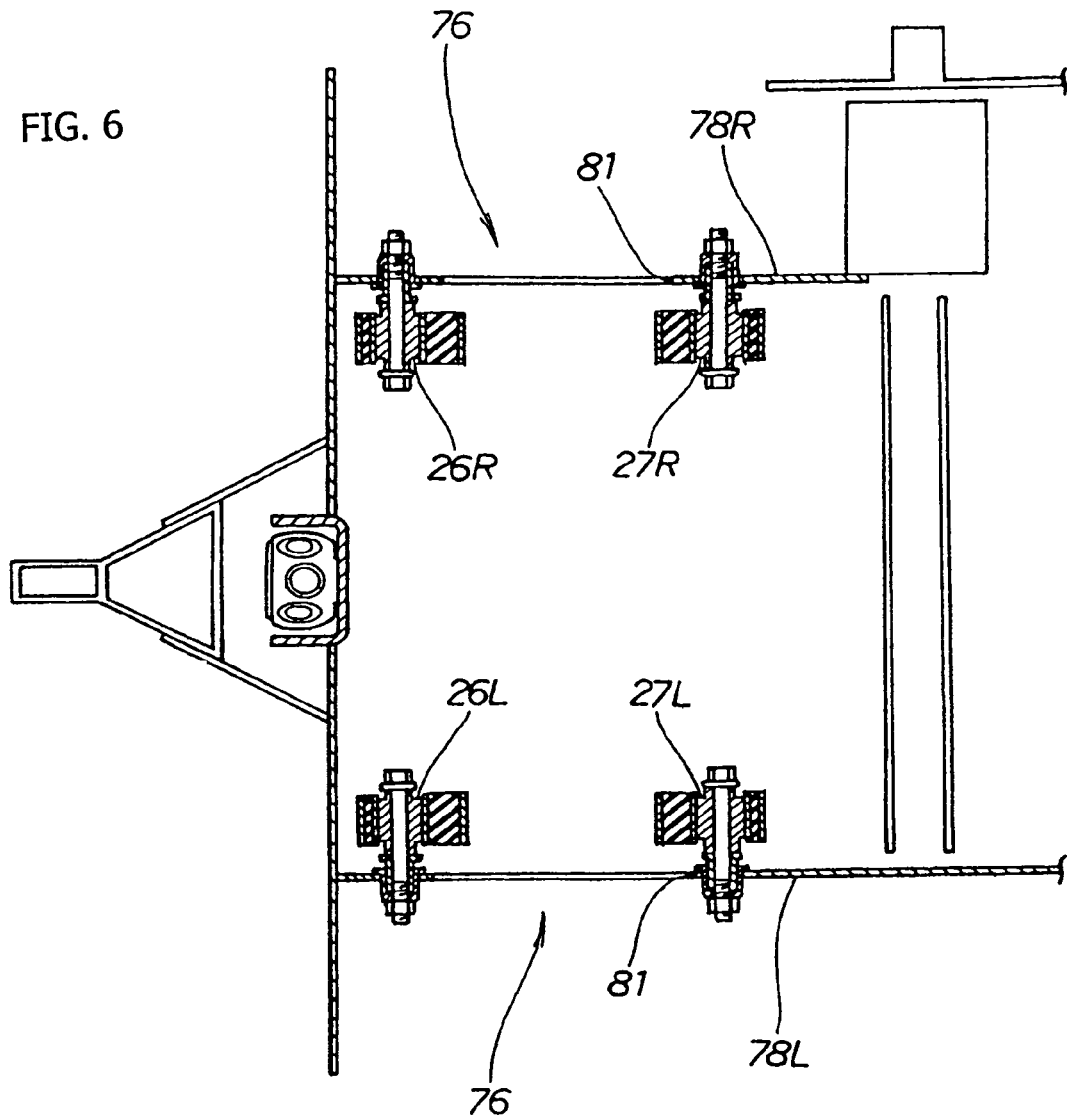
FIG. 6 is a view along arrow 6 of FIG. 2 showing the engine mounting hangers arranged on the front and rear, left and right sides of the frame.

FIG. 6 is a view along arrow 6 of FIG. 2, showing that the left intermediate frame 78L is provided with the engine hangers 26L, 27L, whereas the right intermediate frame 78R is provided with the engine hangers 26R, 27R. The engine is supported on the vehicle body frame 76 through the four engine hangers 26L, 26R, 27L, 27R arranged on the front and rear sides and the left and right sides.

Figure 7:
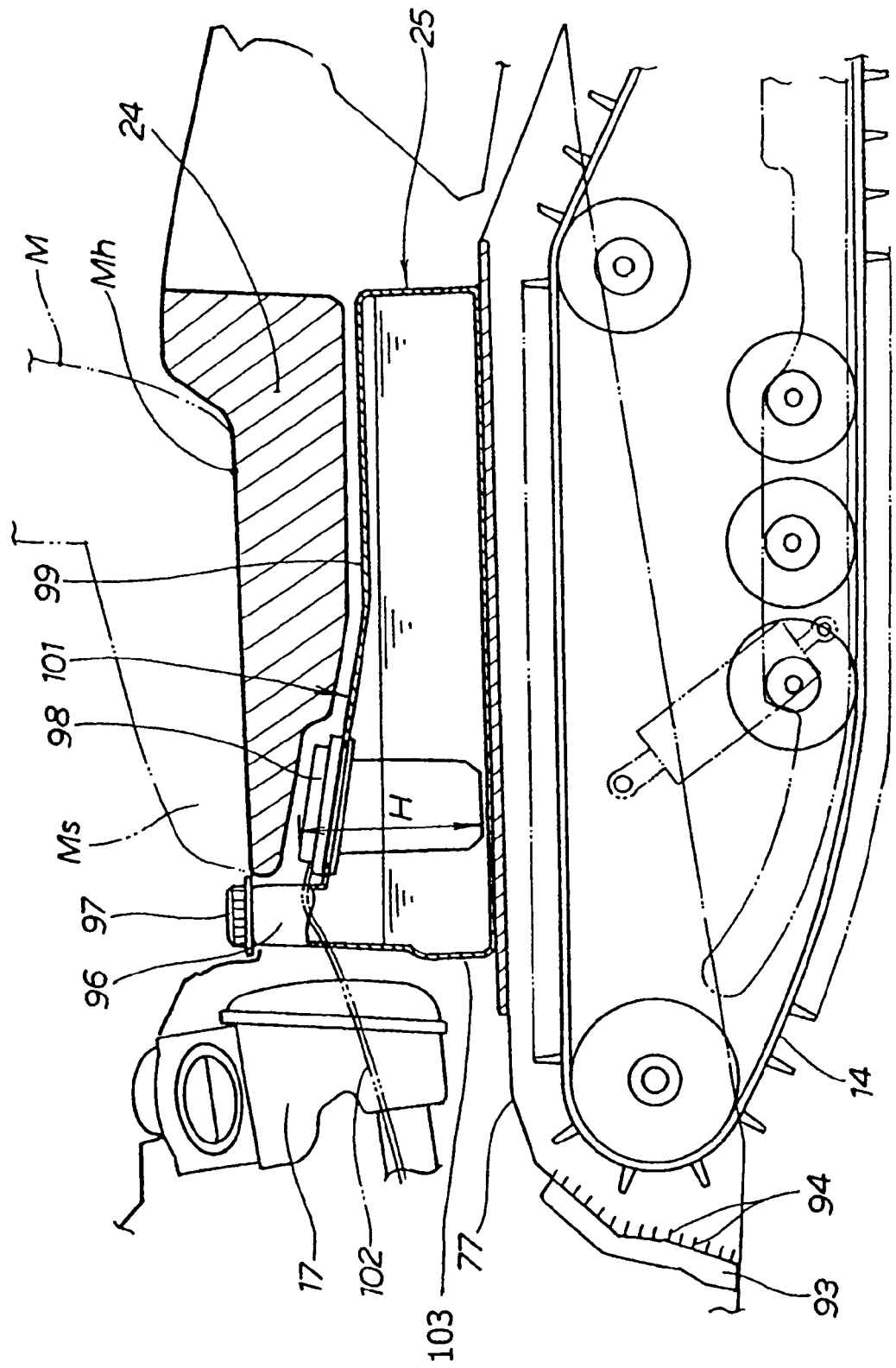
FIG. 7 is a sectional view of a fuel tank according to the present invention showing the fuel tank top surface at the front side thereof raised upward relative to the top surface at a rear portion of the fuel tank, and showing the fuel pump provided in the raised top surface portion for feeding pressurized fuel to the engine.

FIG. 7 is a sectional view of the fuel tank according to the present invention. As stated previously, the snowmobile 10 comprises the seat 24 for the rider on the rear side of the air cleaner 17. In the figure, Mh represents the location of the normal seating position of the rider on seat 24.

The fuel tank 25 is provided below the seat 24, and is elongated in the front-rear direction. The height of the top surface of the fuel tank 25 at the seating position Mh is lower than the height of the top surface of the fuel tank 25 at other portions of the fuel tank. Specifically, the height of the top surface of said fuel tank at a location underlying a rear portion of the seat 24 is lower than the height of said top surface at other portions of said fuel tank. Stated in another manner, the top surface of the fuel tank 25 adjacent to the front side 103 of the fuel tank 25 is positioned to be higher than remaining portions. A raised portion 101, shown here as an incline but not limited to this shape, is provided by joining the relatively high front side 103 of the fuel tank 25 to the top surface of the fuel tank at a location below the seating position Mh. As seen best in FIG. 7, the front wall 103 of the fuel tank 25 extends substantially vertically downwardly, so that a portion of the front wall proximate a bottom surface of the fuel tank is substantially vertically aligned with a portion of the front wall proximate the top surface of the fuel tank. The front wall 103 of the fuel tank 25 has an outwardly bulging portion formed therein adjacent the bottom surface of the tank, and the outwardly bulging portion defines a forwardmost portion of the fuel tank.

The fuel pump 98, for pressurizing and feeding the fuel in the fuel tank 25 to the engine, is provided in the raised portion 101. The fuel pump 98 is attached to the top surface of the fuel tank 25, and the fuel supply pipe 96 for supplying fuel to the fuel tank 25 is provided adjacent to the front side 103 of the fuel pump 98.

Since the fuel pump 98 is attached to the top surface of the fuel tank 25, mounting and piping work for a fuel pipe 102 can be easily carried out from the upper side of the fuel tank 25. In addition, maintenance, such as inspection and replacement of the fuel pipe 102, is easily accomplished.

Further, since the fuel supply pipe 96 for supplying fuel to the fuel tank 25 is provided on the front side of the fuel pump 98, the length of the seat 24 is large.

A radiator 93 is formed as one body with the rear frame 77. The radiator 93 is provided with plural heat-radiating fins 94 so that the snow raked up by the track belt 14 comes into contact with the heat-radiating fins 94. The radiator 93 extends over the entire lower surface of the rear frame 77, providing a large, efficient heat-transfer area.

In addition, it is shown herein that the generally box-shaped fuel tank 25 is disposed on the rear frame 77, and the seat 24 is disposed on the upper side of the fuel tank 25. The seat 24 is formed to be thicker in the region of the seating position Mh of the rider M, and to be thinner at its portion which is clamped by both knees Ms of the rider M. Use of a relatively thin seat adjacent to the knees Ms of the rider M is acceptable since no substantial load is exerted at this location.

On the other hand, since the fuel tank 25 is fitted with the fuel supply pipe 96, a fuel supply cap 97 and the fuel pump 98, it is desirable to provide the fuel supply pipe 96 at a position as high as possible. Additionally, the fuel pump 98 is inserted into the fuel tank 25 from the upper side. As a result, the fuel pump 98 can be inspected immediately upon opening the seat 24.

The engine according to the present invention is a fuel injection type engine, and, for this purpose, it is essential for the fuel pump 98 to be a high-pressure pump and be a large-sized pump. In order to contain the large-sized pump, it is necessary for the fuel tank 25 to have a predetermined height (vertical depth).

In view of this, with respect to a ceiling plate 99 of the fuel tank 25, the portion of the ceiling plate ranging from an intermediate position to a front side 103 is made to be a raised portion 101. The raised portion 101 is inclined forwardly upwards, to provide the required, predetermined height. As a result, the fuel supply pipe 96 can be mounted at a higher position. Similarly, the fuel pump 98 is attached to a higher portion so that the height of the fuel pump 98 is accommodated.

Since the fuel tank 25 is provided with the raised portion 101 on the front side and since the fuel pump 98 is provided in the raised portion 101, the fuel pump 98 can be laid out under the seat 24 even if the dimension H in the vertical direction of the fuel pump 98 is large. In addition, the thickness of the seat 24 at the seating position Mh, where the rider M is normally seated, is made sufficiently large to enhance seating comfort.

Corresponding to this, the height of the fuel tank 25 at a rear half portion is set to be small so as to allow for the thickness of the seat 24, whereby the seating comfort is enhanced. As is clear from the figure, in the present invention, the height of the seat 24 and the height of the fuel tank 25 are harmonized, whereby it is possible to secure both the required thickness of the seat 24 and the required height of the fuel tank 25, while keeping constant the overall height from the top surface of the seat 24 to the bottom surface of the fuel tank 25.

Returning to FIG. 2, the side frames 84L, 84R are added to the vehicle body frame 76, which constitutes the skeleton of the vehicle body. The portions between the upper ends of the front suspensions 64L, 64R and a front portion of the rear shock absorber 44 for supporting the track belt 14 are reinforced with the side frames 84L, 84R. Since the rigidity of the vehicle body frame 76 easily and effectively enhanced by only adding the side frames 84L, 84R, an increase in the engine weight is managed using only the side frames 84L, 84R, and without using any other reinforcement member.

By reinforcing the portions between the front suspensions 64L, 64R with the side frames 84L, 84R, it is possible to effectively enhance the rigidity of the vehicle body frame 76. By adding the side frames 84L, 84R, it is possible to enhance the rigidity of the vehicle body and, therefore, to easily cope with an increase in the engine weight.

While the snowmobile comprising a fuel pump in the inside of a fuel tank according to the present invention has been described with respect to a snowmobile to illustrate the mode for carrying out the invention, the inventive concept can be applied to a motorcycle, and it may also be applied to a vehicles generally.

The snowmobile incorporating a fuel pump in a fuel tank according to the present invention is preferable for application to snowmobiles.

While a working example of the present invention has been described above, the present invention is not limited to the working example described above, but various design alterations may be carried out without departing from the present invention as set forth in the claims.

What is claimed is:

1. A snowmobile comprising:
    an engine provided at a front portion of the snowmobile,
    a seat for a driver on a rear side of the engine,
    a fuel tank provided below said seat, the fuel tank being elongate in the front-rear direction of the snowmobile,
    a fuel pump for pressurizing fuel and feeding the pressurized fuel to said engine, and a fuel supply pipe for supplying fuel to said fuel tank, said fuel supply pipe being provided at a front portion of said fuel tank and being provided in front of a vehicle seat, such that a user may directly access said fuel supply pipe, wherein
    the height of a top surface of said fuel tank at a location underlying a rear portion of said seat is lower than the height of said top surface at other portions of said fuel tank,
    a raised portion is provided by raising upward the height of the top surface of said fuel tank adjacent a front side of said fuel tank,
    said front wall of said fuel tank extends substantially vertically downwardly so that a portion of the front wall proximate a bottom surface of said fuel tank is substantially vertically aligned with a portion of the front wall proximate the top surface of said tank, said front wall having an outwardly bulging portion formed therein adjacent said bottom surface of said tank, and said outwardly bulging portion defining a forwardmost portion of said fuel tank, and
    the fuel pump is provided in said raised portion at a location below the seat.

2. A snowmobile as set forth in claim 1, wherein said fuel pump is mounted to said top surface of said fuel tank.

3. A snowmobile as set forth in claim 1, further comprising an air cleaner disposed between said fuel tank and said engine.

4. A snowmobile as set forth in claim 1, wherein a cylinder of said engine is disposed so as to be inclined toward the rear of the snowmobile.

5. A snowmobile as set forth in claim 1, further comprising a muffler, wherein said muffler is mounted on a front side of the engine such that the engine lies between the muffler and the seat, and wherein said muffler is generally aligned with a longitudinal centerline of the snowmobile.

6. A snowmobile as set forth in claim 5, further comprising a pair of skis,
    a steering shaft operably connected to the skis for steering said snowmobile, and
    a steering handle fixed to an upper end of the steering shaft for actuation of the steering shaft,
    wherein the steering shaft passes between the muffler and the engine.

7. A snowmobile as set forth in claim 1, further comprising a pair of skis,
    a steering shaft operably connected to the skis for steering said snowmobile,
    a steering handle fixed to an upper end of the steering shaft for actuation of the steering shaft, and
    a vehicle body frame including a crossbar portion extending in a direction transverse to a longitudinal axis of the snowmobile,
    wherein the steering shaft is rotatably supported on the crossbar portion.

8. A snowmobile as set forth in claim 1, wherein an overall combined height of the seat and the fuel tank, as measured from a top surface of the seat to a bottom surface of the fuel tank, is a substantially constant value along a majority of the length of said seat in a longitudinal direction of the snowmobile.

9. A snowmobile comprising:
    an engine provided at a front portion of the snowmobile,
    a fuel tank, the fuel tank having a front wall and being elongate in the front-rear direction of the snowmobile,
    a seat overlying said fuel tank, said seat being elongate in the front-rear direction of the snowmobile, and
    a fuel supply pipe for supplying fuel to said fuel tank, said fuel supply pipe being provided at a front portion of said fuel tank and being provided in front of a vehicle seat, such that a user may directly access said fuel supply pipe, wherein
    the height of a top surface of said fuel tank at a location underlying a rear portion of said seat is lower than the height of said top surface at a front side and other portions of said fuel tank,
    the top surface of said fuel tank comprises a raised portion such that the height of the top surface of said fuel tank adjacent the front side of said fuel tank is set higher than the other portions of the top surface of said fuel tank, and
    said front wall of said fuel tank extends substantially vertically downwardly so that a portion of the front wall proximate a bottom surface of said fuel tank is substantially vertically aligned with a portion of the front wall proximate the top surface of said tank, said front wall having an outwardly bulging portion formed therein adjacent said bottom surface of said tank, and said outwardly bulging portion defining a forwardmost portion of said fuel tank.

10. The snowmobile of claim 9 wherein the snowmobile further comprises a fuel pump for pressurizing fuel and feeding the pressurized fuel to said engine, wherein the fuel pump resides within said raised portion.

11. The snowmobile of claim 10 wherein said fuel pump is supported by said top surface of said fuel tank such that it extends downwardly into said fuel tank from said top surface of said fuel tank.

12. The snowmobile of claim 9, further comprising an air cleaner disposed between said fuel tank and said engine.

13. The snowmobile of claim 9, wherein a cylinder of said engine is disposed so as to be inclined toward the rear of the snowmobile.

14. The snowmobile of claim 9, wherein an overall combined height of the seat and the fuel tank, as measured from a top surface of the seat to a bottom surface of the fuel tank, is a constant value along a longitudinal direction of the snowmobile.

15. A snowmobile comprising:
an engine provided at a front portion of the snowmobile;
a seat for a driver on a rear side of the engine;
a fuel tank provided below said seat, the fuel tank having a front wall and being elongate in the front-rear direction of the snowmobile;
a fuel pump for pressurizing fuel and feeding the pressurized fuel to said engine, wherein said fuel pump is disposed under the seat and is mounted to a top surface of said fuel tank;
a fuel supply pipe for supplying fuel to said fuel tank, said fuel supply pipe being provided at a front portion of said fuel tank and being provided in front of a vehicle seat, such that a user may directly access said fuel supply pipe;
a pair of skis;
a steering shaft operably connected to the skis for steering said snowmobile;
a steering handle fixed to an upper end of the steering shaft for actuation of the steering shaft;
a vehicle body frame including a crossbar portion extending in a direction transverse to a longitudinal axis of the snowmobile, wherein the steering shaft is rotatably supported on the crossbar portion; and
a track belt, wherein the snowmobile travels by diving said track belt by power of said engine; wherein
the height of a top surface of said fuel tank at a location underlying a rear portion of said seat is lower than the height of said top surface at other portions of said fuel tank,
a raised portion is provided by raising upward the height of the top surface of said fuel tank adjacent a front side of said fuel tank,
a bottom surface of said fuel tank is substantially flat such that at any point along the width of said fuel tank, the height of the fuel tank remains a constant value, and the fuel pump is provided in said raised portion,
an overall combined height of the seat and the fuel tank, as measured from a top surface of the seat to a bottom surface of the fuel tank, is a substantially constant value along a majority of the length of said seat in a longitudinal direction of the snowmobile; and said front wall of said fuel tank extends substantially vertically downwardly so that a portion of the front wall proximate a bottom surface of said fuel tank is substantially vertically aligned with a portion of the front wall proximate the top surface of said tank, said front wall having an outwardly bulging portion formed therein adjacent said bottom surface of said tank, and said outwardly bulging portion defining a forwardmost portion of said fuel tank.

16. A snowmobile, comprising:
an engine provided at a front portion of the snowmobile,
a seat for a driver on a rear side of the engine,
a fuel tank provided below said seat, the fuel tank being elongate in the front-rear direction of the snowmobile, and
a fuel pump mounted to a top surface of said fuel tank at a location below said seat, said fuel pump provided for pressurizing fuel and feeding the pressurized fuel to said engine, wherein:
the height of a top surface of said fuel tank at a location underlying a rear portion of said seat is lower than the height of said top surface at other portions of said fuel tank,
a raised portion is provided by raising upward the height of the top surface of said fuel tank adjacent a front side of said fuel tank,
the fuel pump is provided in said raised portion, and
a front wall of said fuel tank extends substantially vertically downwardly so that a portion of the front wall proximate a bottom surface of said fuel tank is substantially vertically aligned with a portion of the front wall proximate the top surface of said tank,
wherein the front wall of said fuel tank has an outwardly bulging portion formed therein adjacent a bottom surface of said tank, said outwardly bulging portion defining a forwardmost portion of said fuel tank.

\* \* \* \* \*